Patented Oct. 19, 1954

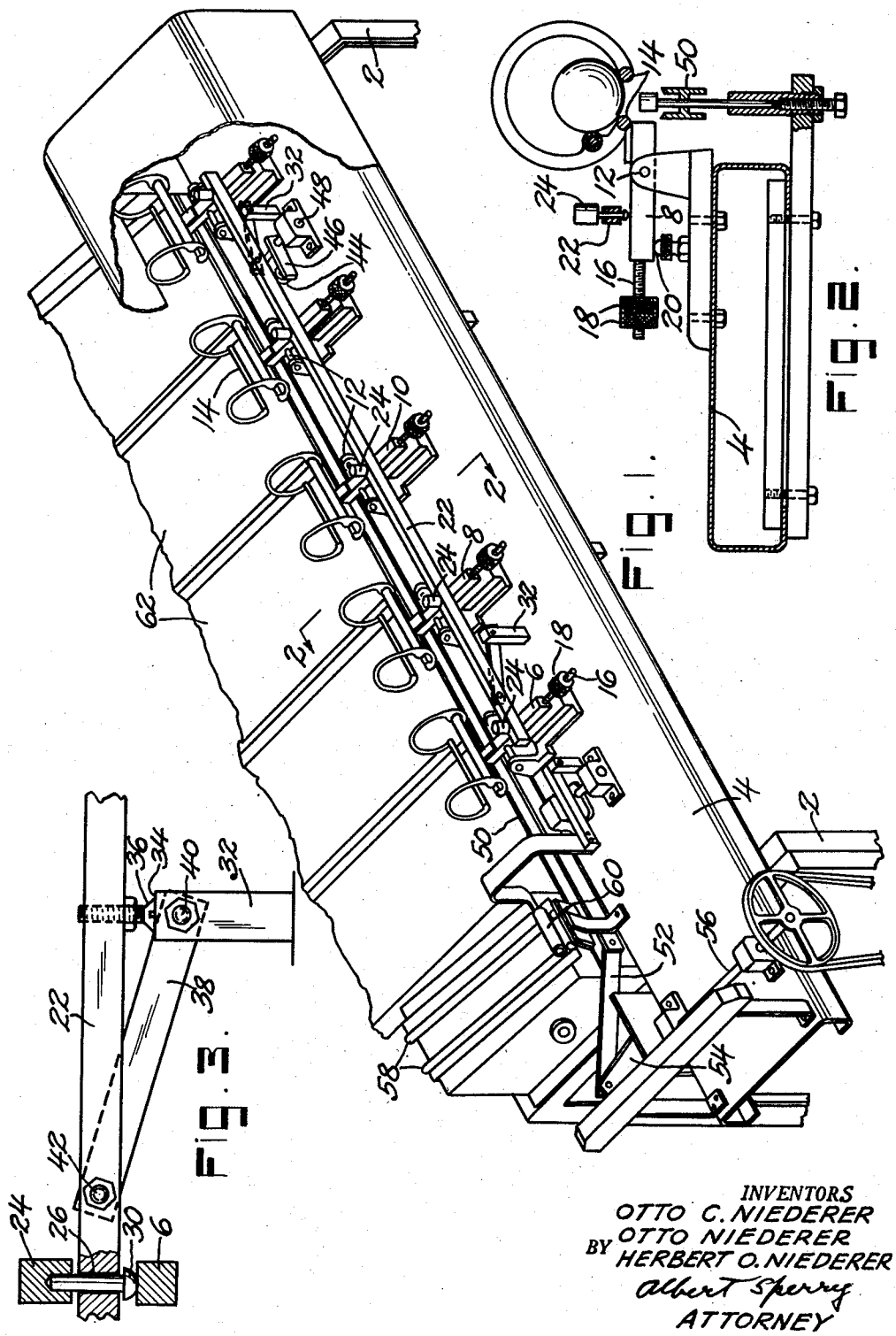

2,692,133

UNITED STATES PATENT OFFICE 2,692,133

LOCKING MEANS FOR WEIGHING EQUIPMENT

Otto C. Niederer, Otto Niederer, and Herbert O. Niederer, Titusville, N. J.

Application November 29, 1951, Serial No. 258,916

5 Claims. (Cl. 265—27)

This invention relates to weighing and sorting equipment of the type wherein a series of balance beams are adjusted to respond to progressively decreasing weights. The invention is directed particularly to means for holding such balance beams in predetermined positions preparatory to a weighing operation.

Egg grading devices and other weighing and sorting equipment in which there are a series of balance beams are generally provided with scale pans or supports for receiving the articles to be weighed together with conveying means which move the articles step by step from one weighing device to another. As each article reaches a weighing device that will respond to its weight the article is discharged from the scale pans or supports into a selected channel or receptacle.

In order to insure accurate operation of such weighing equipment and avoid premature tilting under the influence of the conveying operation, it is necessary to hold the balance beams positively in place in predetermined positions during the operations of moving and positioning the articles on the supports. This has been done heretofore by providing scale locking means in the form of a locking bar or other means which are simultaneously movable into and out of engagement with the balance beams in timed relation to the operation of the conveying means. However, individual adjustment of the elements engaging the balance beams has been necessary in order to hold each balance beam positively in place until released for the weighing operation and such adjustments are tedious and time consuming. Moreover, after the adjustments have been made vibration or wear during use and even the limited distortion of the locking means due to changes in temperature frequently throw the equipment out of adjustment and allow sufficient looseness and play of the balance beam to produce marked inaccuracies in the weights to which the balance beams respond.

In order to overcome these objections to the locking means heretofore provided in weighing equipment and avoid the need for careful and frequent adjustment of the elements, the present invention embodies individual scale locking means which are simultaneously moved into and out of locking positions while serving to insure positive locking of each balance beam independently of any other. This result is preferably obtained by providing weighted members having limited independent movement with respect to the locking means so that when the locking means is moved to a scale locking position the weighted members will positively hold each balance beam in place until the scale locking means is released. Initial and subsequent adjustments of the elements of the assembly is therefore reduced to a minimum and increased accuracy in the weighing and sorting operation is assured.

One of the objects of the present invention is to provide an improved form of scale locking means for the balance beams of weighing equipment.

Another object of the invention is to reduce the need for repeated adjustment of the elements employed for holding balance beams in predetermined positions.

A further object of the invention is to provide scale locking means for weighing equipment embodying a plurality of independently movable weighted members engageable with the balance beams.

A special object of the present invention is to provide egg grading equipment with means for holding each balance beam in a predetermined neutral position without repeated adjustment of the equipment due to wear, vibration or changes in the temperature which would otherwise influence the weighing operation.

These and other objects and features of the present invention will appear from the following description thereof in which reference is made to the accompanying figures of the drawing.

In the drawing:

Fig. 1 is a perspective of a portion of typical egg grading equipment embodying the present invention;

Fig. 2 is a vertical sectional view through the construction illustrated in Fig. 1 taken on the line 2—2 thereof; and Fig. 3 is an enlarged view partially in section, illustrating a detail of the construction shown in Fig. 1.

In that form of the invention chosen for purposes of illustration in the drawing the weighing equipment is in the form of an egg grading device similar to that shown in the copending application of Niederer et al. Serial No. 789,542, filed December 3, 1947. In such equipment there is a frame 2 upon which is mounted on a base 4 having a series of balance beams 6, 8 and 10 located in spaced positions lengthwise of the base. The balance beams are mounted on pivot means indicated at 12 and each balance beam has article supporting means 14 secured thereto adjacent one end thereof. The opposite end of the balance beam is provided with a threaded bolt 16 on which threaded weights 18 are movable to permit adjustment of the balance beams so that they will tilt or respond to eggs of predetermined weight.

Beneath the rear portion of each balance beam there is located a stationary stop member 20 provided with a threaded adjustment for establishing the predetermined position in which the balance beam is to be held between successive weighing operations. A scale locking bar 22 extends lengthwise of the base 4 above the rear portions of the balance beams and is movable vertically toward and away from the balance beams to urge each balance beam into engagement with the stationary stop means 20 associated therewith. The locking bar 22 is provided with weighted members 24 which as shown are mounted on the pins 26 which pass through openings in the locking bar. The lower end of each pin 26 is provided with a rounded head 30 engageable with the upper surface of the balance beam upon movement of the scale locking bar to a lowered scale locking position. The length of the pin 26 is such that the weight 24 and the head 30 are spaced apart a distance sufficiently greater than the vertical thickness of the locking bar to allow limited movement of the pin and weight vertically with respect to the locking bar.

The locking bar is raised and lowered in predetermined timed relation with respect to the operation of the conveying means so as to hold the balance beams in engagement with the stationary stop means 20 during the movement of the eggs from one position to another and preparatory to a weighing operation. For this purpose posts 32 are mounted on the base 4 and are provided at their upper ends with rests 34 positioned to be engaged by the locking bar and to support the bar in its lowered position. If desired the rest 34 may be made adjustable with respect to the post 32 and the locking bar may be provided with an adjustable abutment screw 36 for establishing a definite lowered position for the locking bar. Links 38 are pivotally connected near one end thereof to the posts 32 as indicated at 40 and are connected at their opposite ends to the locking bar at 42. A roller 44 mounted on the arm 46 attached to the rocking shaft 48 is engageable with the lower surface of the locking bar 22 so that when the shaft 48 is rotated in a clockwise direction as seen in Figs. 1 and 3 the locking bar is raised. As the bar rises it engages the weights 24 and lifts the pins 26 from the upper surface of the balance beams to release the balance beams for a weighing operation. Thereafter, when the locking shaft 48 is rotated in a counter-clockwise direction the locking bar is lowered by gravity until the abutment screws 36 carried by the locking bar engage the rests 34 on the upper end of the posts 32.

Any suitable form of conveying means may be provided for moving the articles to be weighed from one weighing device to another. As shown the conveying means is in the form of a bar 50 which is movable through an elliptical path by the action of the link 52 connected to a crank arm 54 attached to the motor driven shaft 56. The eggs to be graded are fed to the conveying means one at a time along the tracks 58 under control of a barrier 60 which is raised and lowered in timed relation to the operation of the conveyor. Thus when the conveying bar 50 is lowered the barrier 60 is raised whereupon the foremost egg on the tracks 58 rolls forward into position to be picked up by the conveyor and advanced to the first weighing device 6. The conveyor then rises and carries the egg forward lowering it onto the support 14 of the balance beam 6 whereupon it may be weighed. On continued elliptical movement of the conveyor bar 50 another egg is received from the tracks 58 while the egg previously deposited on the weighing device 6 is picked up and advanced to the weighing device 8 if it has not been discharged during the weighing operation. The cycle of operations is repeated to move one egg after another from one weighing device to another so that each egg may be weighed and discharged into one of the channels 62 according to its weight.

During the operations of advancing the eggs from one weighing device to another the scale locking bar 22 is moved into a lower position in which the weights 24 are caused to rest upon the upper surfaces of the rear position of the balance beams. The balance beams are thus pressed down against the stationary stop members 20 and are positively held in fixed position during the placement of an egg on the egg supporting means 14 of the balance beam. The lowered position of the locking bar 22 is slightly above the neutral position of the balance beam but the lowered positions of the heads 30 of the pins 26 connected to the weights is slightly below the neutral position of the balance beam. Therefore when the locking bar is lowered the weight of the members 24 is transferred from the locking bar to the balance beams to hold each balance beam positively in engagement with its stop member 20 independently of any other balance beam.

In the event the locking bar should be distorted or should not be positioned accurately with respect to each balance beam, the movable weight 24 will nevertheless serve to hold the balance beam in place since the head 30 of the pin 26 attached to the weight projects sufficiently far below the scale locking bar to insure engagement of the head with the balance beam and serve to transfer the weight from the locking bar to the balance beam. Initial adjustment of the equipment to insure positive locking of each balance beam is therefore limited to positioning of the stationary stop means 20 so as to hold the balance beam in a predetermined position and adjustment of the rests 34 on the upper ends of the posts 32 for engagement by the adjusting screws 36 carried by the locking bar. Such adjustments may be made very roughly and without special attention to each individual balance beam. At the same time each balance beam will be positively held in place by the weight 24 upon lowering of the locking bar to its locking position. Changes in temperature and other minor distortions or bending of the locking bar will have no effect upon the accuracy of the weighing operations because the weights 24 will in every case be moved with respect to the locking bar into position to transfer the weight from the locking bar to the balance beam as the locking bar approaches its lowered position.

When the locking bar is lifted by the rocking shaft 48 it rises until the upper surface of the locking bar engages the lower surface of the weight 24 whereupon the weights are lifted from the balance beams and each balance beam is released for accurate weighing of the egg which has been deposited on the egg supporting means 14 carried by the balance beam.

While the weighted members have been shown and described above as being slidably movable with respect to the locking bar they can, of course, be pivoted or otherwise connected to the locking bar for movement relative thereto when the locking bar is lowered to transfer the weight of the members to the balance beams for holding them in predetermined positions. Similarly a plurality of locking bars each carrying one or several weighted members may be moved toward and away from the balance beams to transfer the weights to the balance beams for holding each balance beam positively in place preparatory to a weighing operation. It will also be evident that any preferred type of conveying means may be employed for moving the eggs or articles to be weighed from one weighing device to another.

In view thereof it should be understood that the particular form of the invention shown in the drawing and described above is intended to be illustrative only and is not intended to limit the scope of the invention.

We claim:

1. Weighing equipment comprising a plurality of balance beams, stop means located beneath one end of each balance beam, locking means located above said end of each balance beam and movable into and out of a lowered scale locking position, weighted members carried by said locking means and each having a portion projecting below said locking means in position to engage a balance beam when said locking means is moved to said lowered scale locking position, said weighted members being movable with respect to said scale locking means to transfer the weight thereof to said balance beams to hold said balance beams positively in engagement with said stop means while said locking means is in said lowered scale locking position.

2. Weighing equipment comprising a plurality of balance beams, stop means located beneath one end of each balance beam and positioned to hold said balance beams in predetermined positions, locking means located above said end of each balance beam and movable into and out of a lowered scale locking position, rest means engageable by said locking means when in said lowered scale locking position and positioned to hold the locking means slightly spaced from the balance beams when the latter are in said predetermined positions, weighted members carried by the locking means and each having a portion projecting below the locking means and into engagement with a balance beam, said weighted members being movable with respect to the locking means to transfer the weight thereof to said balance beams on movement of the locking means into engagement with said rest means to hold said balance beams in said predetermined positions and in positive engagement with said stop means while said locking means is in said lowered scale locking position.

3. Weighing equipment comprising a plurality of balance beams, stop means located beneath one end of each balance beam and positioned to hold said balance beams in predetermined positions, a scale locking bar extending above said ends of said balance beams and movable into and out of a lowered scale locking position, rest means engageable by said bar when said bar is in said lowered scale locking position and positioned to hold the locking bar slightly spaced from the balance beams when the latter are in said predetermined positions, said locking bar having openings passing vertically therethrough, weighted members resting on said locking bar and each having a portion extending through one of said openings and projecting below the bar into position to engage said balance beams, said weighted members being movable with respect to said bar as the latter approaches said lowered scale locking position to transfer the weight thereof to the balance beams and hold the balance beams in positive engagement with said stop means and in said predetermined position and to be lifted from the balance beams to release the same when said locking bar is raised from said rest means.

4. Egg grading mechanism comprising a plurality of spaced balance beams adjusted to respond to progressively decreasing weights, conveying means for moving eggs one after another from one of said balance beams to another, means for holding said balance beams in predetermined positions during movement of said eggs including stop means engageable by said balance beams, locking means movable toward and away from said balance beams, weighted members carried by the locking means and positioned to engage each of the balance beams to urge them toward said stop means, said weighted members being movable with respect to the locking means on movement of the latter toward the balance beams to transfer the weight of said weighted members to the balance beams, and means for raising and lowering said locking means in timed relation to movement of the conveying means to raise the locking means and the weighted members between successive movements of said eggs.

5. Egg grading mechanism comprising a plurality of balance beams arranged in spaced relation and each having egg supporting means adjacent one end thereof, conveying means movable in a cycle to transfer eggs from one of said supports to another, stop means located beneath the opposite ends of each balance beam, means for holding each of said balance beams in predetermined positions during that portion of each cycle of operation of the conveying means wherein an egg is being moved from one support to another, said locking means including a bar extending above the rear end of each balance beam and carrying weighted members which are movable with respect to said bar, operating means for raising and lowering the bar, rests engageable by the bar when the latter is in a lowered position, said weighted members having portions projecting below said bar and engageable with said balance beams to urge the balance beams downward into engagement with said stop members as said bar approaches said rest whereby the weight of said members is transferred from said bar to said balance beams to hold said balance beams in said predetermined positions, and means for actuating said conveying and operating means to raise said bar and weighted members during a portion of each cycle of the conveying means between successive movements of said eggs.

References Cited in the file of this patent

UNITED STATES PATENTS

| Number | Name | Date |
|---|---|---|
| 2,246,597 | Niederer et al. | June 24, 1941 |

FOREIGN PATENTS

| Number | Country | Date |
|---|---|---|
| 446,203 | Great Britain | Apr. 27, 1936 |